United States Patent Office 2,918,385
Patented Dec. 22, 1959

2,918,385

QUICK SETTING CEMENTITIOUS COMPOSITION

Donald J. Arpin and Julien J. Arpin,
Fort Lauderdale, Fla.

No Drawing. Application June 21, 1957
Serial No. 667,273

7 Claims. (Cl. 106—97)

This invention relates to cementitious compositions particularly useful in connection with masonry structures located underwater.

In the construction of underwater structures as well as the maintenance thereof, cementitious compositions must possess a number of properties in order to make the same of maximum utility. In addition to strength after setting, the composition must provide a structure which is highly resistant to wave impact and to substantial water pressures.

Accordingly, an object of this invention is to provide a novel cementitious composition which is quick setting; which shows a progressive increase in strength after initial set; which is highly resistant to attrition induced by contact with flowing water; which will bond readily to other surfaces under or exposed to water; and which will not check or crack while setting.

Another object of this invention is to provide a novel cementitious composition for underwater use wherein the proportion of ingredients may be varied over given ranges in order to provide in the end product selected properties such as high ultimate strength and resistance to attrition.

Other objects of this invention will in part be obvious and in part hereinafter pointed out.

The composition of the instant invention comprises essentially Portland cement, kaolin and anhydrous calcium sulfate. Such composition may be admixed with sand in varying proportions at the time of actual use, with the addition of selected amounts of water.

The ingredients of the composition are thoroughly and intimately mixed together as by means of a rotary mixer or other mixing devices known in the art. Thus, to form one composition having a number of desirable properties when used as a filling or repair means for cracks or breaks in pre-cast concrete sea walls and pilings as well as other structures as referred to hereinafter; about 39% of Portland cement, 25% air floated kaolin and 36% of anhydrous calcium sulfate, all by volume are thoroughly mixed together in a rotary mixer.

The foregoing composition may have added thereto at the time of actual use, sand in the proportions by volume of about 33% to about 43%, the composition amounting from about 57% to 67% by volume. The smaller proportion of sand is used when exceptionally high resistance to attrition is required. The resultant mixture is combined with water to produce a final aggregate in which the water may amount to 20% to 50% by volume.

The aggregate of the instant invention is fast setting, with the initial set, in the instance described, being completed in about 5 minutes. Accordingly, in the form described, the mixing of the ingredients, delivery of the mixture to the place of use and the application thereof must all be completed within said 5 minute period. It has been found that the mixed ingredients may be conveniently formed into balls of five inches in diameter and dropped into the water from a point about ten feet above the water level, the balls being picked up by a diver below the water level and quickly applied to the cracks or breaks in the structures which are to be repaired.

The applied material bonds firmly and quickly to the masonry or metal surfaces and provides an effective seal even with high water pressures applied to the seal. The composition then continues to increase in strength reaching substantial ultimate strength values.

Where seals or repairs are to be made on masonry structures exposed to fast flowing waters and strong wave action, sand may be materially reduced as an ingredient of the mixture, and where conditions are extremely rugged, the sand may be omitted.

The proportion of water used in the mixture is such as to obtain what is known as a 0 or zero slump when subjected to the conventional slump test. In such test, as is well known, the mix to be tested is rodded into a cylinder in a vertical position. When the cylinder is lifted off vertically, the slump of the column of mix is measured in inches. While as indicated a zero slump is preferred, it has been found that a softer mix may be made with increased proportions of water, yet the composition will not slough off on being subjected to contact with running water.

Where the conditions of use are such that maximum resistance to attrition is desired, the composition may be formulated from 30 parts Portland cement, 45 parts kaolin and 25 parts anhydrous calcium sulfate, all by volume.

If maximum ultimate strength in combination with a reasonable resistance to attrition is desired, the composition may be made of 70 parts of Portland cement, 20 parts kaolin and 10 parts anhydrous calcium sulfate, all by volume.

It has been found that with compositions of the instant invention, seals and repairs made with such material are highly resistant to attrition by wave action and to water pressure, even during the setting period, thus facilitating repair and sealing of sea walls and the like. Since the composition does not check or crack during the initial setting period, leakage and other deleterious effects are avoided.

The composition of this invention may also be used for effecting emergency repairs to seagoing vessels and to seal sunken ships in order that they may be salvaged. For example, holes in a steel ship, below the water line, may be plugged by applying a ball of the aggregate which is slightly larger than the hole so as to seal the edges. The material is held in place until it sets, generally well within a five minute period. The material may be applied from either within the ship against the water pressure or from the water side of the ship. In a sunken vessel, the sealing of all orifices is easily accomplished with the above described composition. Thereafter, the ship may be raised by conventional air displacement methods. It is further to be noted that "underwater structures" include other types of structures normally found in watery environments such as dams, underwater tubes, sewers and the like.

There has been shown what is now considered a preferred embodiment of the invention but it is obvious that numerous changes and omissions may be made without departing from its spirit.

What is claimed is:

1. A quick setting cementitious composition for underwater use consisting essentially of a mixture in parts by volume of 30 to 70 parts Portland cement, 10 to 36 parts anhydrous calcium sulfate and 20 to 45 parts kaolin.

2. A quick setting, underwater cementitious composition consisting essentially of an intimate mixture of Portland cement, kaolin and anhydrous calcium sulfate, said ingredients being present in the proportion by volume of about 39% Portland cement, about 25% kaolin and about 36% anhydrous calcium sulfate.

3. A quick setting cementitious composition for underwater use consisting essentially of by volume of from about 33% to about 43% of sand and from about 75% to about 67% of a mixture of Portland cement, kaolin and anhydrous calcium sulfate, the ingredients of said mixture being present in the proportion by volume of from 30 to 70 parts cement, from 20 to 45 parts kaolin and from 10 to 36 parts anhydrous calcium sulfate.

4. A quick setting cementitious composition for underwater use consisting essentially of by volume of about 70 parts Portland cement, about 20 parts kaolin and about 10 parts anhydrous calcium sulfate, said composition having high ultimate strength.

5. A quick setting cementitious composition for underwater use consisting essentially of by volume of about 30 parts Portland cement, about 45 parts kaolin and about 25 parts anhydrous calcium sulfate, said composition showing high resistance to attrition by water.

6. A quick setting cementitious composition for underwater use consisting essentially of by volume from 0 to 43% sand and from 57% to 100% of a mixture of Portland cement, kaolin and anhydrous calcium sulfate, the ingredients of said mixture being in the proportion by volume of about 39% cement, about 25% kaolin and about 36% anhydrous calcium sulfate.

7. A quick setting cementitious composition consisting essentially of a mixture in parts by volume of 30 to 70 parts Portland cement, 10 to 36 parts anhydrous calcium sulfate and 20 to 45 parts kaolin.

References Cited in the file of this patent
UNITED STATES PATENTS

| | | |
|---|---|---|
| 1,396,546 | Badder | Nov. 8, 1921 |
| 2,248,033 | Wallace et al. | July 1, 1941 |